March 4, 1969  J. P. ELLINGTON  3,431,169

NUCLEAR REACTOR FUEL ELEMENTS

Filed Dec. 19, 1966

United States Patent Office 3,431,169
Patented Mar. 4, 1969

3,431,169
NUCLEAR REACTOR FUEL ELEMENTS
John Peter Ellington, Paddington, Warrington, England, assignor to United Kingdom Atomic Energy Authority, London, England
Filed Dec. 19, 1966, Ser. No. 602,927
Claims priority, application Great Britain, Dec. 30, 1965, 55,235/65
U.S. Cl. 176—68                  4 Claims
Int. Cl. G21c 3/22

ABSTRACT OF THE DISCLOSURE

A nuclear reactor fuel element comprising sheathing exposed externally to flowing coolant and containing ceramic nuclear fuel whose density in aggregate is less than (for example 85%) maximum theoretical density so as to provide distributed voidage, has a solid interlayer having thermal insulating properties disposed in contact between sheathing and fuel. The interlayer contains no fissile or fertile atoms, and serves to increase the operating temperature of the fuel, and therefore to lower its compressive creep strength, whereby irradiation-induced swelling of the fuel is absorbed in said voidage.

---

Figure 1:
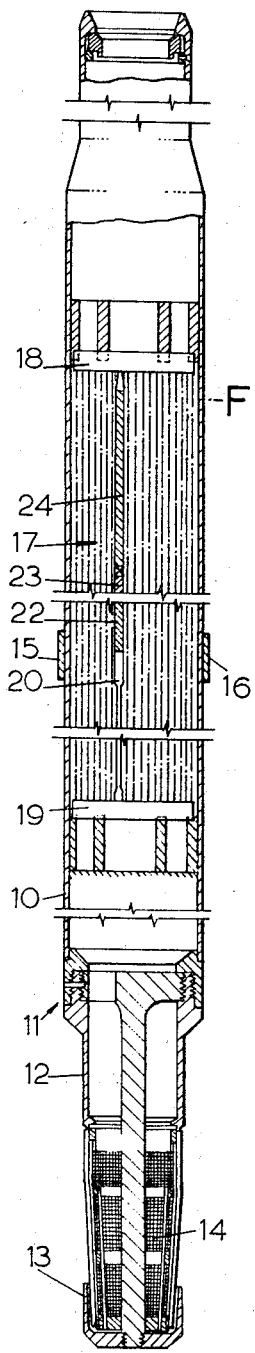

The present invention concerns fuel elements suitable for fast nuclear reactors having ceramic fuel in a closely fitting metal sheath. Current research on ceramic fuels, such as a mixed uranium/plutonium dioxide or monocarbide, is showing that fuel swelling, which is caused by the solid and gaseous fission products, can be a prime cause of fuel element failure and thereby produce a limit on attainable burn-up of heavy atoms. There are strong economic incentives to achieve as high a fraction of heavy atom burn-up as possible in fast reactors.

An important role of the sheath of reactor fuel is the holding of the fuel to a predetermined shape. This role may be less of a requirement with coherent metal fuel which can be relied on to stay in one piece and can therefore be manufactured with a gap between the fuel and its sheathing. However, with ceramic fuel the integrity is less reliable, and may even be nonexistent initially if the fuel is granulated or pulverulent. It is therefore usual for ceramic fuel to be closely fitting in its sheath.

Closely fitting sheathing is inevitably exposed to the fuel swelling and therefore becomes subject to bursting force. In general there are two approaches to the problem of how to prevent bursting; the first is to build sufficient strength into the sheathing to resist the swelling forces and the second is to remove, if possible, the swelling tendency itself. Both approaches can lead in the same direction, that is to say, the direction of reducing the fuel section, or thickness, to a minimum. This result arises because, on the basis of the first approach, one wishes to avoid making the sheathing too thick on account of the thermal gradients that may occur across it; on the basis of the second approach, the swelling forces are largely eliminated if the fuel can be kept cool enough. However, when a fuel element in the form of a pin is considered, especially the latter criterion of keeping the fuel cool enough to largely eliminate swelling forces demands for the heat output ratings typical of fast reactors a pin diameter so small as to be rather like that of a needle. Such extreme reduction of section increases enormously the number of separately manufactured units required in a nuclear reactor of given size and is apt to sacrifice reliability for the reasons that the chances of structural materials realising their true mechanical properties diminish with size and the proliferation of separate components increases statistically the number of probable failures.

The present invention stems from the appreciation that the basic reason for straining of the sheathing by fuel swelling is that an outer rim of the fuel behaves like a continuous arch as it swells. This is true for the fuel surface temperatures typical of fast reactors at the present time because at such temperatures the fuel is strong and highly resistant to deformation. In other words the straining or bursting forces on the sheathing are not of a hydraulic nature but depend upon the strength of the fuel. The strength is in turn dependent upon resistance to compressive creep and this resistance is reduced with increasing temperature. Thus, by arranging that fuel swelling is associated with hotter and therefore more plastic fuel, it is reasoned that as swelling proceeds the fuel would be able to flow plastically into neighbouring voidage.

It is therefore in general contrast to previous thinking that the invention calls for higher rather than lower fuel temperatures, at least in respect of fuel regions where the higher fission rates prevail.

Present indications are that a fuel temperature not below 1,000° C. would be appropriate to ensure that the internal absorption of swelling into neighbouring voidage may be achieved with certainty for a fuel like a fissile dioxide. In an elongated element it is generally not feasible or even necessary to aim for such a high surface temperature towards the ends of the element. Typically there is a downward temperature gradient towards the ends which results from a lowering of neutron flux density and hence fission rate in the fuel. The lower fission rate implies less swelling tendency and hence less need for measures to avoid swelling at the external surface. The main aim should therefore be to obtain the 1,000° C. minimum fuel temperaturt at least in the maximum burn-up region of the element; such region is typically at the mid-length of the fuelled section of an elongated element.

The metals at present contemplated for fuel sheathing must be kept at a temperature considerably lower than 1,000° C. Stainless steels and certain nickel alloys are currently favoured for the sheathing to be used in liquid metal cooled fast reactors but the maximum temperature which these will allow does not exceed 700° C. Accordingly, the invention provides a nuclear reactor fuel element, especially for a fast reactor, having metallic sheathing for exposure externally to a flowing coolant and an interlayer of solid material disposed between and directly contacting both the sheathing and a mass of ceramic fuel within the sheath; the fuel has a density which is less than the theoretical maximum density in order to contain porosity or distributed voidage and the solid material of the interlayer has a low thermal conductivity, preferably lower than that of the fuel, so as to act in the role of a thermal insulant which increases the operating temperature of the fuel and hence lowers its compressive creep resistance. By virtue of the solidity of the interlayer, a close fit of the sheath plus interlayer on the fuel still pertains so that the fuel is peripherally restrained. However, only a relatively light restraint should suffice for causing the weakened fuel to be squeezed into the voidage. In this way the irradiation swelling is accommodated internally. If the fuel is in the form of presintered pellets the voidage may be concentrated, as by the provision of a hole, or if the fuel is loose the packing density may be controlled to give the desired voidage fraction. In the case of sheathing of the sealed type, as distinct from the vented type, there would be provided further the feature of an unfuelled portion of sheathing which acts as a reservoir for fission product gases liberated from the fuel. Fuel types which show greatest reduction of creep strength with temperature will be preferred but the invention is nevertheless applicable to any ceramic fuel. Examples besides the oxides and carbides are nitrides and silicides.

Figure 2:
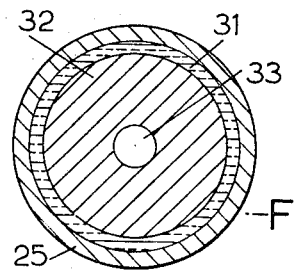

In order to describe the invention further, reference will be made to the examples illustrated in the accompanying drawings in which:

FIG. 1 is a longitudinal section of a fuel assembly for a liquid metal cooled fast reactor, the fuel in this assembly being contained in fuel pins, and FIG. 2 is a cross section through a form of fuel pin embodying the invention in a manner suitable for use in a fuel assembly as is shown in FIG. 1.

In FIG. 1 an outer hexagonal casing 10 of the assembly has a bottom fitting 11 comprising spaced cylindrical bearing surfaces 12 and 13 for fitting into a socket of a reactor core support structure so that the assembly is supported in cantilever fashion by this structure. Between the bearing surfaces there is a stainless steel knitmesh filter 14 which enables coolant (assumed in these examples to be sodium) supplied to an inlet plenum incorporated in the core support structure to enter into the bottom of the casing 10 and to be forced upwards therein. When positioned in the core each assembly is separated from its neighbours only by narrow gaps which are predetermined by the pitch of the sockets in the core support structure and by corner abutments or pads such as 15 and 16 projecting from the casing.

The fuel pins indicated 17 are clustered within the casing 10 in parallel array on a triangular lattice, the lattice pitch being large enough to ensure that the pins do not come into contact with one another; they float captively between top and bottom support plates 18 and 19 and are located transversely at intervals along the length of the cluster by grid structures (not shown). The coolant forced upwards in the casing therefore flows longitudinally over the pins for removal of the heat generated thereby.

The fuel pin appearing in section in FIG. 1 illustrates how a void length 20 amounting to about half the length of each pin to act as a reservoir for gases released by the fuel in service is arranged at the lower end. This void length is provided since the pins are assumed to be of the cooled type. Above the void length there are three sections represented diagrammatically, namely a lower breeder section 22, a fuel section 23 and an upper breeder section 24. It is with the fuel section that the invention is primarily concerned and therefore the content of the breeder sections can be arranged in any way which is appropriate in combination with the fuel section arrangement now to be described with reference to FIG. 2.

In FIG. 2 the metallic sheathing of the fuel pin is indicated at 25. It is assumed that this sheathing is of thin-walled cylindrical stainless steel tube. Ceramic fuel 32 is in the form of annular pellets having a central hole 33. Between the fuel and the sheathing is an interlayer 31 of annular shape which is in direct contact with both the fuel and the sheathing.

The material of that interlayer is selected for low thermal conductivity and compatibility with the materials of the fuel and sheathing. Preferably the thermal conductivity of the interlayer material is less than that of the fuel material. If the fuel is $(UPu)O_2$, as is assumed in this example, both criteria may be fulfilled by the use of zirconia for the interlayer. For resistance against deterioration by neutron irradiation, the zirconia is best stabilised with calcium oxide. A typical value of the thermal conductivity of zirconia is 0.0168 w./cm.° C. which compares favourably with the value of about 0.020 w./cm.° C. for $(U_{0.8}Pu_{0.2})O_2$ at 1,800° C.

Using an interlayer of zirconia as in FIG. 2 a relatively small thickness is sufficient to make the fuel surface temperature about 300° C. hotter than the outer surface of the interlayer at a linear fuel rating of 375 watts/cm. With the fuel pin in service at the design heat output rating this outer surface is likely to have a temperature between 700 and 800° C. in the region of maximum burn-up of the fuel, i.e., approximately the mid-length of the fuelled section of the pin, and therefore the fuel surface temperature can be expected to exceed 1,000° C.

The central hole 33 reduces the maximum or centre temperature of the fuel and can so help in ensuring that this temperature does not exceed the melting point of the fuel. The relative size of hole as illustrated is aimed in conjunction with the figures and assumptions already mentioned to give a centre temperature 1,800° C. hotter than the outer surface of the interlayer.

In conjunction with the increase of fuel surface temperature it is essential to provide distributed voidage in the fuel itself. Based on the provision of between 1 and 2% voidage per designed percent maximum burn-up of heavy atoms, an aggregate voidage amounting to at least 15% of the fuel volume is considered appropriate. In other words, the fuel should possess in aggregate a density which is preferably less than 85% of the maximum theoretical density. In the present example, the central hole 33 represents useful voidage since the fuel bounding this hole is at the centre temperature and therefore hot enough to be in the so-called "soft" state which allows squeezing of the fuel into the hole. The hole therefore contributes to the requisite voidage but only to the extent of about 6% in this example. The extra voidage is obtained by less than theoretical in the fuel pellets themselves. Thus, 86% dense fuel in the pellets would achieve a density in aggregate of about 80% of the maximum theoretical density.

With all of the fuel, at least in the region of maximum burn-up of the fuel pin, at a temperature of at least 1,000° C. there is created throughout the fuel such reduced resistance to compressive creep that irradiation-induced swelling can be absorbed in the voidage of the fuel. Consequently the metallic sheathing is relieved of much of the severity of the swelling force. An indication of the extent to which the compressive creep strength of ceramic fuels is reduced with increasing temperature can be gained from the paper by Armstrong et al. at pages 133 to 141 of Journal of Nuclear Materials, 7 No. 2 (1962).

While the above example deals specifically in many respects with a particular set of circumstances, it will be appreciated that many variations of the invention are possible within the scope as defined by the appended claims and without departing from the spirit and general purpose of the invention as herein described. This is especially true where different circumstances apply. Compatibility with the fuel and sheathing may call for alternative interlayer materials where other kinds of fuel and sheathing are used. Examples of the available choice of interlayer materials are alumina, beryllia, pyrolytic carbon with the minimum conductivity direction perpendicular to the adjoining fuel surface, and magnesia. The last-mentioned is appropriate for monocarbide fuel. Furthermore the interlayer need not be continuous or of uniform thickness. So long as fuel portions coming close to the sheathing are limited in number and well spaced apart so as to avoid the formation of a continuous arch, these portions, although cooler and hence stronger, may still not give rise to any increase of pressure on the sheathing. Even if they prove to be virtually undeformable it is conceivable that they will tend to embed themselves into the main body of the fuel.

In general the manufacture will depend on the nature of the materials, the required thicknesses and the densities. Apart from processes involving preforming one component and filling the other as a powder, others which are open to consideration according to the circumstances are flame spraying and coextrusion. For densifying packed powder interlayers, or simply for ensuring tight engagement with the sheathing, use could be made of a rotary swaging or explosive forming operation performed on the sheathing after filling.

I claim:

1. A fast reactor fuel element comprising metallic sheathing for exposure externaly to a flowing coolant, fuel contained within said sheathing and comprising substantially unmoderated ceramic nuclear fuel of density less than 85% of maximum theoretical so as to include distributed voidage, a solid thermal insulating interlayer disposed between said sheathing and said fuel and in direct contact with substantially all of the adjacent sheathing and with the fuel for increasing the operating temperature of the fuel to at least 1,000° C. at the surface thereof adjoining said interlayer in at least the region of maximum burn-up of the fuel and hence lowering the compressive creep resistance thereof to enable absorption of irradiation-induced swelling of the fuel in said distributed voidage.

2. A fast reactor fuel element according to claim 1 wherein said interlayer is devoid of fissile or fertile atoms and has a lower thermal conductivity than that of the fuel.

3. A fast reactor fuel element according to claim 1 wherein said nuclear fuel is mixed uranium/plutonium dioxide, and said interlayer is zirconia stabilized with calcium oxide.

4. A fast reactor fuel element according to claim 1 wherein said nuclear fuel is mixed uranium/plutonium monocarbide and said interlayer is magnesia.

References Cited

UNITED STATES PATENTS

| | | | |
|---|---|---|---|
| 3,291,699 | 12/1966 | Trickett et al. | 176—69 X |
| 3,331,746 | 7/1967 | Margen | 176—72 X |
| 2,864,758 | 12/1958 | Shackelford | 176—91 X |
| 3,072,555 | 1/1963 | Barth et al. | 176—72 X |
| 3,085,059 | 4/1963 | Burnham | 176—73 |

FOREIGN PATENTS

| | | |
|---|---|---|
| 1,029,949 | 5/1958 | Germany. |
| 831,679 | 3/1960 | Great Britain. |
| 928,517 | 6/1963 | Great Britain. |

CARL D. QUARFORTH, *Primary Examiner.*

M. J. SCOLNICK, *Assistant Examiner.*

U.S. Cl. X.R.

176—72, 91